S. K. DENNIS.
MANURE SPREADER.
APPLICATION FILED MAR. 13, 1913.

1,207,000.

Patented Dec. 5, 1916.
2 SHEETS—SHEET 1.

Witnesses:

Inventor.
Samuel K. Dennis,
By Chas. E. Lord
Atty.

S. K. DENNIS.
MANURE SPREADER.
APPLICATION FILED MAR. 13, 1913.
1,207,000.
Patented Dec. 5, 1916.
2 SHEETS—SHEET 2.
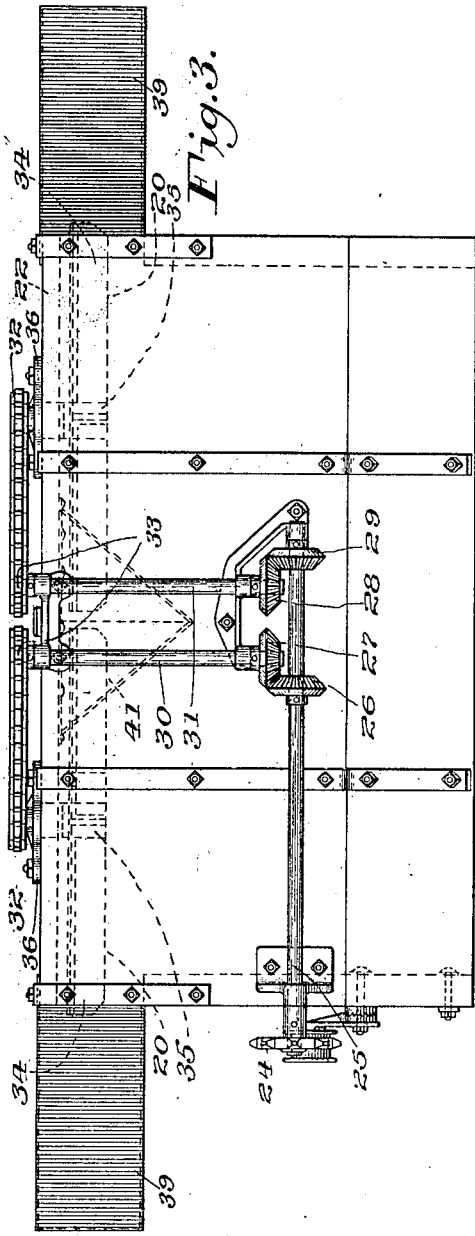
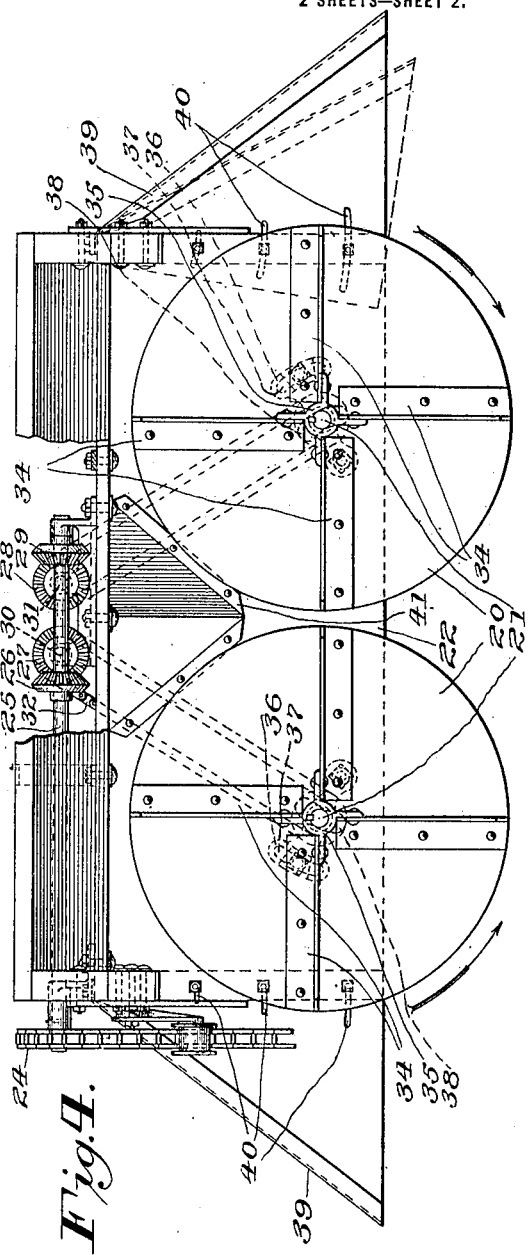
Witnesses:
Inventor:
Samuel K. Dennis,
By Chas. E. Long
Atty.

UNITED STATES PATENT OFFICE.

SAMUEL K. DENNIS, OF CHICAGO, ILLINOIS, ASSIGNOR TO INTERNATIONAL HARVESTER CORPORATION, A CORPORATION OF NEW JERSEY.

MANURE-SPREADER.

1,207,000.   Specification of Letters Patent.   Patented Dec. 5, 1916.

Application filed March 13, 1913. Serial No. 753,930.

*To all whom it may concern:*

Be it known that I, SAMUEL K. DENNIS, a citizen of the United States, residing at Chicago, in the county of Cook and State of Illinois, have invented certain new and useful Improvements in Manure-Spreaders, of which the following is a full, clear, and exact specification.

My invention relates to manure spreaders. It has for its object to spread manure in an improved manner.

A further object of my invention is to spread said material in such a manner as to deliver the same directly to the ground with a positive downward impetus over a path of increased width, which path may be varied as desired. I attain these objects by providing improved means adapted to coöperate with the discharging mechanism of a spreader, and in an improved manner spread the material delivered thereby.

In order that my invention may be clearly and fully disclosed, I have illustrated in the accompanying drawings one embodiment which the same may assume in practice. It is to be understood, however, that the form herein shown is susceptible of modification.

Figure 1:
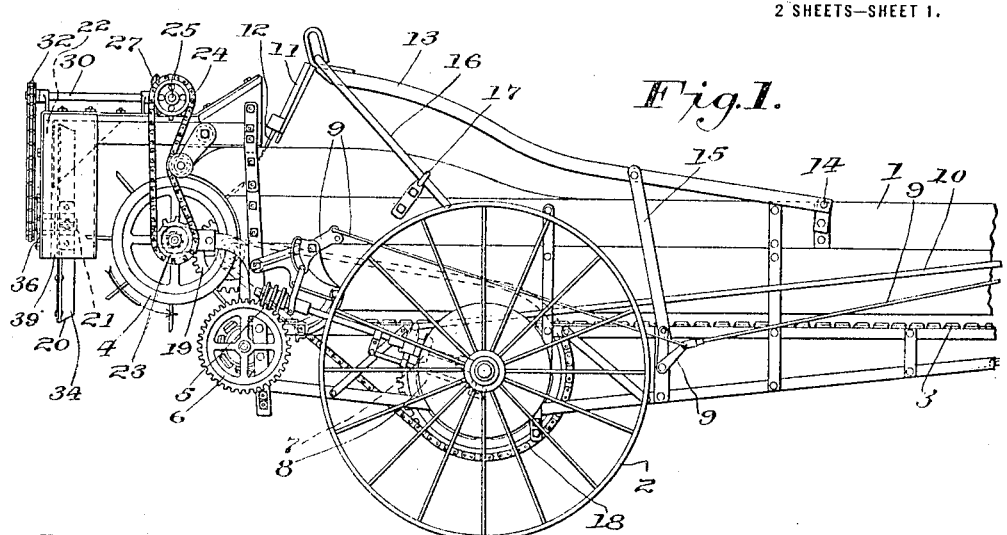
Figure 2:
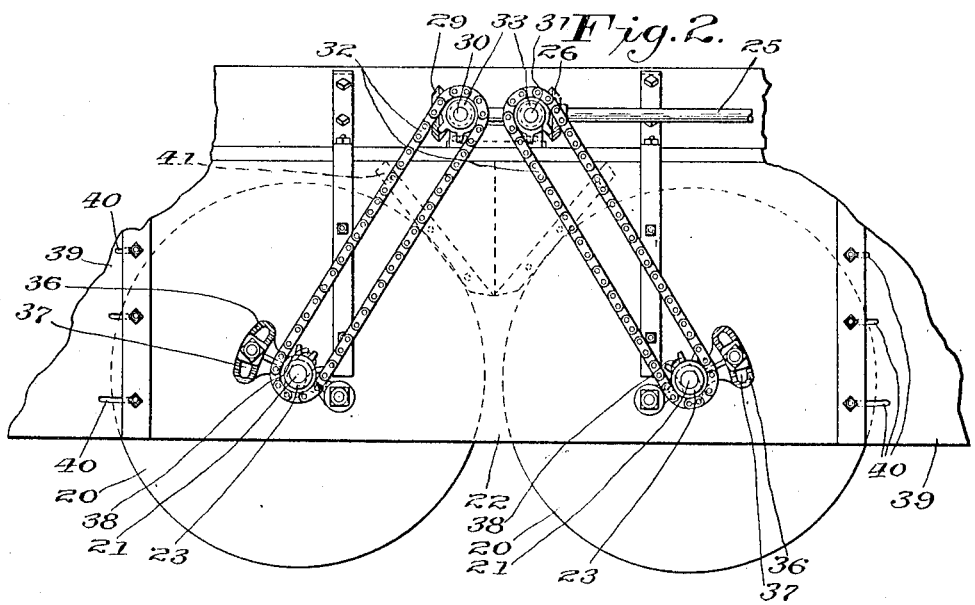

Figure 1 is a side elevation of the rear end of a spreader; Fig. 2 is a rear elevation of a portion thereof, parts of the casing being broken away; Fig. 3 is a top plan view of the rear end of the spreader; Fig. 4 is an end elevation of the spreader looking in the opposite direction from Fig. 2.

The spreader shown herein, when broadly considered, comprises a wagon box 1 carried upon wheels 2, and provided with a traveling apron 3 and beater 4, both operatively connected to the wheels 2 and operable to distribute the material in the box 1 as said apron is fed forward and coöperating with improved automatically operated supplemental spreading mechanism hereinafter described to spread the material distributed therefrom in an improved manner throughout a path of greater width than it is possible for the beater to spread the same.

I will first describe the spreader *per se* in order that the relation between the same and my improvement may be more readily understood. The wagon box 1 may be of any desired construction mounted upon any suitable running gear. In a preferred form the apron 3 is rotated from the wheels 2 through the well known worm and gear connection 5—6, a speed changing gear connection 7—8 of a well known type being provided to control the connection of the same to the axle. Both of these connections are placed under the control of the operator through suitable hand operated mechanism including pivoted link connections 9 and 10 extending to the front of the spreader adjacent the operator's seat (not shown). As in the usual construction, a movable tail gate 11 having tines 12 upon its lower end is preferably provided and pivotally mounted upon the rear end of a rearwardly extending member 13. pivoted at 14 to the top of the wagon box 1, the tail gate 11 and member 13 being controlled in their movement by the movement of the link 9 and a coöperating link 15, and also being guided in their movement by a guiding member 16 moving through an eye bolt 17 upon the side of the wagon box.

Coöperating with the apron operating mechanism and carried by the box 1 adjacent the rear end of the apron 3 and just at the rear of the end gate 11 is the beater 4 and its coöperating mechanism. The beater 4 may be of any desired type and is, as in the usual construction, adapted to rotate in a counter-clockwise direction. In a preferred form it is operatively connected to the wheels 2 through a chain and sprocket connection 18 and gearing 19 and the relation of these connections is such that the beater is rotated at a high speed. It is to be noted in this connection that the tail gate 11 in its elevated position shown in Fig. 1 is so held with respect to the beater 4 that its tines 12 are projected above the same in such a manner as to divide up and deflect the material fed by the apron 3 so that it is fed in the desired condition and amount to the arms of the beater.

In my improvement, I provide means adapted to coöperate with the beater and be operatively connected thereto which serve to increase the scope of distribution of the material fed out from the beater and at the same time deliver the same to the ground in an improved manner. These means are shown in the form of a plurality of oppositely rotating disks 20 disposed substantially at right angles to a tangent from the top of the beater 4 and in the path of the material discharged therefrom. These disks are mounted on short horizontally disposed axles 21 journaled in the rear wall of a downwardly extending hood 22 having an open bottom and carried at the rear of the beater and projecting over the same in substantially box shape. This hood is shown to be removably attached by any suitable means to the rear end of the spreader box 1 at a point intermediate the beater and the tail gate. It may, however, obviously be built in the spreader box if desired. The disks 20 therein are disposed in a substantially vertical plane and operatively connected to a sprocket 23 carried upon one end of the beater shaft through a vertically disposed chain and sprocket connection 24, a shaft 25 extending at right angles thereto and suitably journaled upon the top of the hood 22, bevel gears 26, 27, 28, and 29 operatively connected to said shaft, a plurality of horizontally disposed stub shafts 30 and 31 likewise carried on the top of the hood 22 and carrying the gears 27 and 28, and chain and sprocket connections 32 and 33 operatively connected between the rear ends of the shafts 30 and 31 and the rear ends of the disk axles 21. In the form shown herein, the bevel gears 26 and 29 are oppositely disposed and spaced apart from each other at the inner end of the shaft 25 so that when the shaft is rotated the same impart rotation in opposite directions to the bevel gears 27 and 28, and thus cause the disks 20 to rotate in opposite directions.

In a preferred form, the disks 20 are of a diameter considerably larger than the inside diameter of the beater 4 and are so disposed with respect to the latter that the material discharged therefrom strikes against the upper halves of the same. The disks are preferably formed of sheet metal and the surfaces of the same adjacent the beater 4 are provided with radially extending distributing vanes or strips 24. In the form shown herein, four of these vanes are protruded substantially at right angles to each other on each disk and the vanes themselves are formed of angle material suitably riveted to the bodies of the disks and to radially extending lugs on the hubs 35 thereof. These disks 20 are further relatively adjustable with respect to the hood 22 in adjustable bearings 36 fixed to the rear wall of the hood and adjustable at will in arc shaped slots 37 to adjust the disk axles 21 in similarly shaped slots 38 provided in the end wall of the hood. It is to be noted that the disks 20 may be adjusted whenever desired to give a suitable tension to the chain connections 32, 33.

Coöperating with the disks 20 and adjustable to vary the width of the material spread by the same, are a pair of downwardly disposed laterally extending wings or shields 39 carried upon the opposite sides of the hood 22. These wings 39 are substantially triangular in shape and are provided with an open side and an open end (Fig. 4). The open sides of the same are adjustably attached to the sides of the hood 22 on opposite sides of the disks 20 (Fig. 3), by any suitable means as by a slotted connection 40 (Fig. 4), while the open flared ends of the same are directed downward. It is thus seen that these adjustable wings form deflecting members adjacent the disks 20 and that the slanting walls of the same may be so adjusted as to distribute to any desired width the material discharged from the disks as the latter are rotated.

In order that no material fed to the disks 20 may be lodged between the same and within the hood 22, I provide a substantially triangularly shaped deflector 41 which is carried within the hood and attached to the rear wall of the same at a point above the disks 20 and between the same (Fig. 4). This deflector is provided with slanting outwardly protruding walls which act to deflect any material discharged against the same by the disks 20 to one or the other of the disks and thus insure the immediate discharge of the same. As in the case of the disks 20 this deflector 41 may be made of sheet metal if desired.

The operation of the construction shown is as follows: During the transport of the spreader while loaded, the end gate 11 is of course lowered and the apron 3 and beater 4 are thrown out of gear by the link connection 9. When the operator desires to commence spreading the material, the end gate 11 is raised, and the apron 3 and beater 4 are thrown into gear with the wheels 2 by manipulating the link connections 9. As soon as this is done the manure is distributed by the beater 4 and the disks 20. Should the operator desire to vary the rate of this distribution, this is readily done by adjusting the link 10. Since the disks 20 are operatively connected to the beater 4 through the chain and gear connections mentioned, these disks are rotated in opposite directions at a high rate of speed immediately across the path of the material distributed by the beater. This material therefore strikes the rotating disks squarely and is carried off thereby to one side or the other by the radially extending arms 34 upon the disks and deposited upon the ground evenly at the rear of the machine with a positive downwardly directed throwing action, the width of which may be regulated at will by adjusting the shields or wings 39.

It is to be noted that in this construction, means are provided which positively discharge the material delivered by the beater with a positive downward impetus, so that the same is immediately and directly delivered to the ground. Attention is further directed to the fact that a more even distribution is obtained by the provision of the rotating disks which also act to further divide up the material. It is further to be noted that by this construction the possibility of the wind carrying away the lighter particles of the material is likewise minimized since all of the material is immediately and positively thrown directly downward upon the ground. The operating mechanism for the disks is further entirely out of the path of the material. Attention is further directed to the fact that by the provision of the adjustable wings for the hood the width of spread may be readily adjusted to any desired degree. It is further to be noted that the mechanism shown herein is adapted to be attached to and coöperate with a spreader of standard construction and is further of a simple and rugged construction which may be readily and cheaply manufactured.

While I have described one form of my invention in this application, it is, of course, to be understood that my invention is not limited to the embodiment shown herein for purposes of illustration, but is susceptible of modification without departing from its spirit.

What I claim as new, and desire to secure by Letters Patent, is:

1. In a machine for distributing manure and the like, a body to contain the material, delivering means, and means for engaging the manure as it emerges in a horizontal stream and deflecting it vertically downward with a positive force.

2. In a machine for distributing manure and the like, a body to contain the material, delivering means, and means for engaging the manure as it emerges in a horizontal stream and deflecting it vertically downward with a positive force throughout a path extending beyond the sides of the body.

3. In a manure spreader, distributing mechanism, supplemental distributing means for positively ejecting the material delivered therefrom vertically downward in a thin sheet through an extended path, and means for varying the width of spread thereof.

4. In a manure spreader, beater mechanism, and mechanism coöperating therewith delivering the material discharged therefrom vertically to the ground over a path extending beyond either side of the spreader.

5. In a manure spreader, feeding mechanism, distributing mechanism, and supplemental distributing mechanism coöperating therewith to discharge the material fed thereto directly downward to the ground with a positive impetus through a path of relatively greater width.

6. An attachment for a manure spreader comprising a hood adapted to be fitted to the spreader in the path of the material discharged therefrom, and vertically arranged distributing mechanism carried in said hood comprising a plurality of rotatable members arranged in position to receive the material against their vertical faces for ejecting it in a downward direction over a path extending beyond their width.

7. An attachment for manure spreaders comprising a hood having an open bottom and adapted to be attached to the rear end of the spreader, and a plurality of rotatable members carried within said hood and provided with vertically arranged vaned faces adapted to be placed in the path of the material discharged from the spreader.

8. In a manure spreader, a wagon box, mechanism for feeding the material therein toward the rear of the same, distributing mechanism for distributing said material, means coöperating therewith to divide up the material delivered to said distributing mechanism, and supplemental means coöperating with said distributing mechanism to further divide up the material delivered thereby and positively discharge the same directly toward the ground through a path of increased width.

9. In a manure spreader, shredding mechanism, and means for positively ejecting the material delivered therefrom vertically downward in a thin sheet through an extended path.

Chicago, Ill., Mar. 5, 1913.

In testimony whereof I affix my signature, in the presence of two witnesses.

SAMUEL K. DENNIS.

Witnesses:
WM VAN DER VLIET,
C. H. MANGOLD.

Copies of this patent may be obtained for five cents each, by addressing the "Commissioner of Patents. Washington, D. C."